United States Patent [19]

Deane

[11] Patent Number: 5,033,080

[45] Date of Patent: Jul. 16, 1991

[54] METHOD AND APPARATUS FOR IDENTIFYING THE SOURCE OF PAGE COMMUNICATION IN A PARTY-LINE INTERCOM PAGING SYSTEM

[75] Inventor: David W. Deane, Vidalia, Ga.

[73] Assignee: X-ID Systems, Inc., Vidalia, Ga.

[21] Appl. No.: 505,556

[22] Filed: Apr. 6, 1990

[51] Int. Cl.[5] .................... H04M 9/02; H04M 9/06
[52] U.S. Cl. .................................................. 379/170
[58] Field of Search ............... 379/170, 171, 172, 173, 379/167, 159

[56] References Cited

U.S. PATENT DOCUMENTS

| | | | |
|---|---|---|---|
| 3,080,454 | 3/1963 | Wenrich et al. | 379/170 |
| 4,847,888 | 7/1989 | Cox et al. | 379/171 |

Primary Examiner—Stafford D. Schreyer
Attorney, Agent, or Firm—Rhodes, Coats & Bennett

[57] ABSTRACT

The present invention provides a method and apparatus for monitoring page communications in an intercom system having multiple stations connected to a common party line. A station module is connected to and continuously monitors each intercom station. During page communications, the source station from which the page communication originates produces a unique local station signal which is detected by the station module. The station module generates a station identification code in response to a local station signal being detected. The station identification code is transmitted over the existing party line to a master station which recognizes the station identification code. The master station includes a computer interface that provides a standardized signal to an industry standard computer for displaying and recording information regarding page line usage.

9 Claims, 5 Drawing Sheets

METHOD AND APPARATUS FOR IDENTIFYING THE SOURCE OF PAGE COMMUNICATION IN A PARTY-LINE INTERCOM PAGING SYSTEM

FIELD OF THE INVENTION

The present invention relates generally to intercom and paging systems and more particularly to a page party intercom system having means to identify the source station of page communications.

BACKGROUND OF THE INVENTION

General access page intercom systems are in widespread use in industrial plants throughout the United States. These system permit page announcements throughout a facility of necessary information to the facility personnel. The page intercom system is frequently used to provide general information to personnel, to request personnel to answer on specified telephone type intercoms, or in emergency situations to request assistance or to provide instruction.

Persons making false announcements, cat calls, or other abusive noises on an intercom system annoy and possibly endanger other personnel by interrupting emergency communications. A familiar example of abusive communications is the transmission of "cat calls" during emergency drills at a nuclear facility. In addition to disrupting the drill, additional expense is incurred by the facility when the drill is required to be repeated due to the interruptions. Such abusive uses of the intercom system lower the prospect for safe operation of the facility. Many more examples of abusives calls are commonly experienced in all types of industries.

To minimize abuse of a page intercom system, it is desirable to identify the station where the abusive call originates. In a central exchange telephone system, identification of the station of origin is easily accomplished since each station is connected to a dedicated or private line. The source of a communication can be identified by simply monitoring wire usage. In party line systems, however, all stations are connected to a common party line. Therefore, it is not possible to identify the station of origin by monitoring the party line.

SUMMARY AND OBJECTS OF THE PRESENT INVENTION

The present invention relates to an intercom paging system including a plurality of intercom stations connected to a party line and a page line. Normally, the intercom station operates in a party line mode transmitting communications over the party line. The intercom station, however, can be switched to a page line mode in which communications are transmitted over the page line and broadcast by speakers located throughout the facility.

A station module is connected to each intercom station to enable monitoring of page communication originating from that station. The station module detects a local station signal which is unique to the intercom station from which a page communication originates. In a preferred embodiment of the invention, the local station signal being detected is a mute signal which is normally used in existing intercom stations to mute speakers adjacent the intercom station from which the page communication originates.

When a local station signal is detected by the station module, it generates a unique station identification code for the intercom station which is transmitted at a high frequency over the party line to a master station. The master station provides an interface between the party line and a standard "clone" computer which records both the time of the page communication and the station identification code. The codes can be displayed on the computer in real time or can be stored for subsequent retrieval and analysis.

By providing station identification for all page communications, management personnel are able to identify the source of "cat calls" and other abusive uses of the intercom system. Additionally, there is the benefit of knowing the source location of emergency request calls made using the page intercom system.

Based upon the foregoing, it is apparent the primary object of the present invention is to provide means for identifying intercom stations among a plurality of different stations from which page communications originate.

Another object of the present invention is to provide means for station identification which does not require special wiring, but rather uses the existing wiring in a page intercom system.

Another object of the present invention is to provide means for station identification in an intercom paging system which can be applied to existing intercom systems without modification or rewiring of the existing system.

Other objects and advantages of the present invention will become apparent and obvious from a study of the following descriptions and the accompanying drawings which are merely illustrative of such invention.

DETAILED DESCRIPTION OF THE INVENTION

Figure 1:
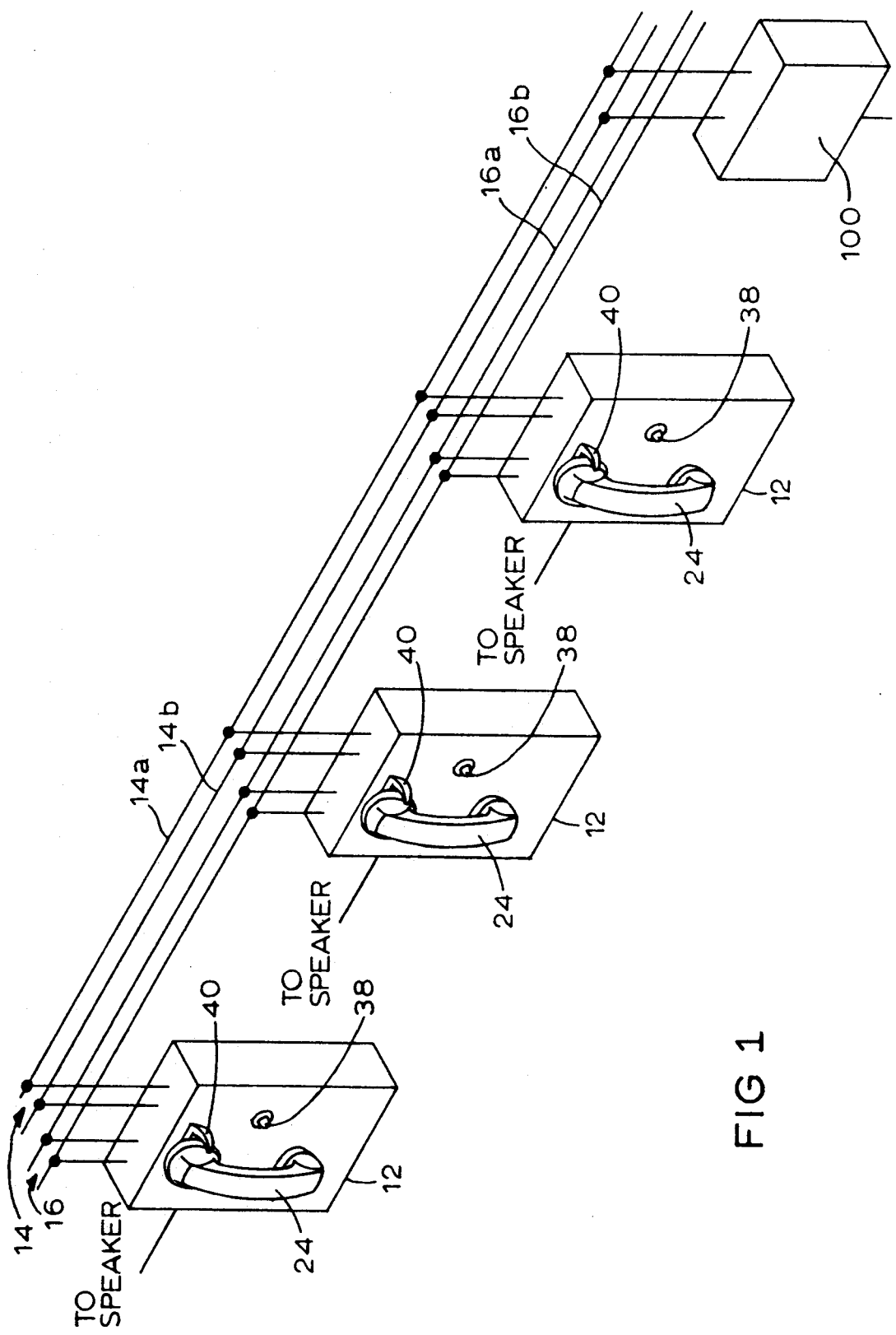
FIG. 1 is a block diagram of the intercom paging system of the present invention showing the intercom station, station module, master module and computer.

Referring now to FIG. 1, typical intercom paging system is shown therein and indicated generally by the numeral 10. The intercom paging system includes a plurality of intercom stations 12 connected to first and second party lines 14 and 16. The first party line 14 includes a pair of wires 14a and 14b and is used for party line communications when the intercom stations are in the party line mode. The second party line also include a pair of wires 16a and 16b which are used to make page communications when the intercom station 12 is switched to page line mode. For purposes of clarity, the second party line 16 will be referred to in the specification as the page line 16.

Each intercom station 12 includes a telephone-type handset 24. In the party line mode, the handsets 24 are used by personnel at different locations to communicate with one another. The intercom station 12 also includes a speaker (not shown in FIG. 1) for making page announcements. To make page announcements, a page button 38 is depressed to place the intercom station in page line mode. In page line mode, the handsets 24 are used to broadcast announcements or page calls over the speakers 28 located throughout the facility. A common use of the page line mode would be to page someone located somewhere in the facility. The intercom station 12 remains in the page line mode only while the page button is depressed. When the page button is released, the intercom station 12 returns back to party line mode.

Each intercom station 12 includes a station module 18 to enable monitoring of page communications from that intercom station 12. The station module, which is not shown in FIG. 1, is typically containing within the intercom station housing. Whenever a page communication is made from one of the intercom stations 12, the local page station module generates a station identification code which is transmitted with the voice signals over the existing party line 14. The station identification code is a low level high frequency code which cannot be heard by the user since the page speakers and handsets of the existing intercom systems are not capable of responding to the frequencies used to transmit the code. Furthermore, these transmissions are at a frequency (40khz) which is well below the radio frequency bandwidth so as to interfere with the other plant equipment. A single master station module 100 connects a dedicated computer to the party line 14 and permits the dedicated computer to receive the station identification codes from the station module 18.

Figure 2:
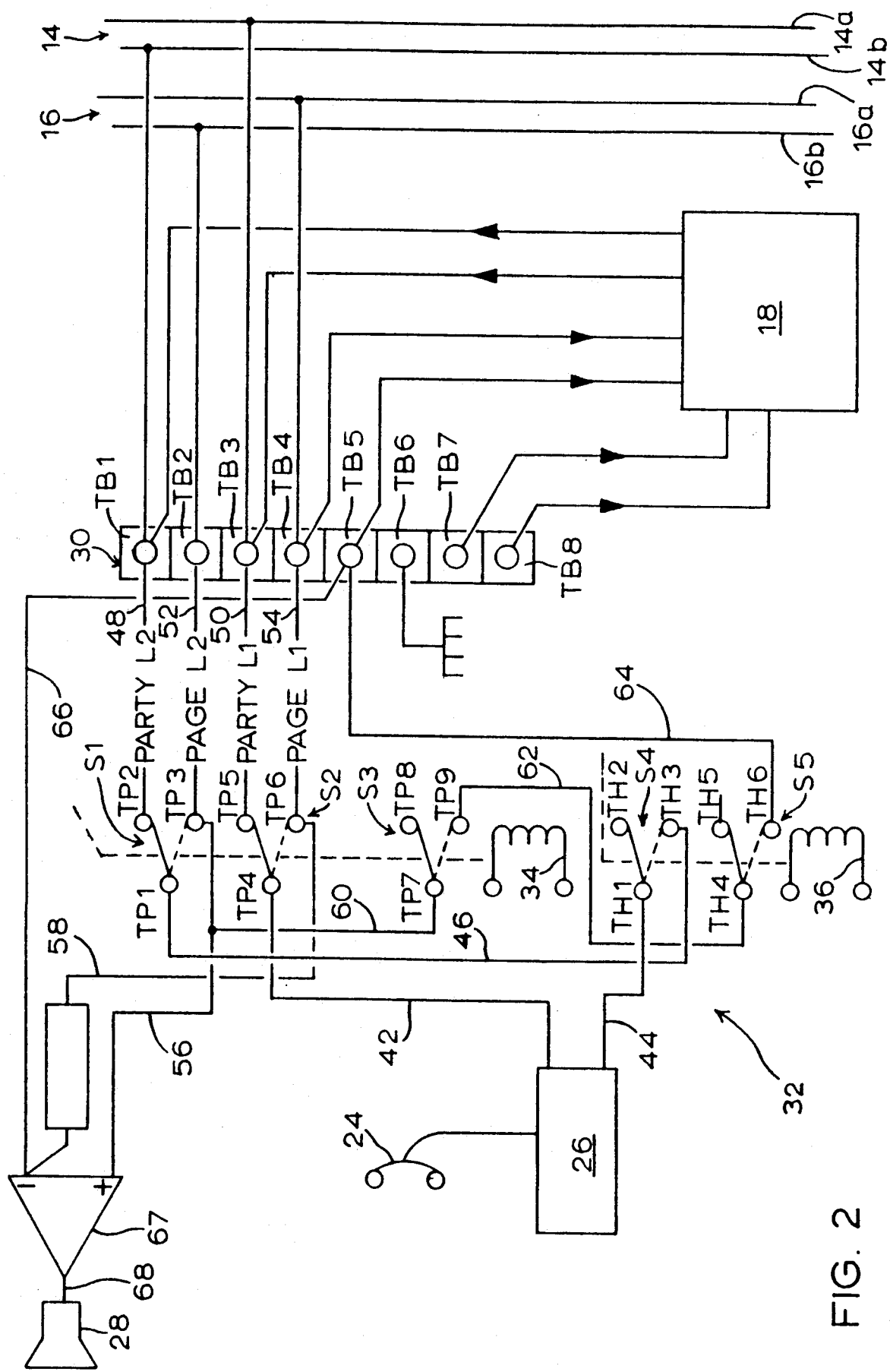
FIG. 2 is a schematic diagram of the intercom station.

Referring now to FIG. 2, a typical intercom station 12 is illustrated schematically. Whether making page line or party line communications, the voice signals originate by speaking into the handset 24. An amplifier 26 converts the audible signals received from the handset 24 to an electrical signal. In the party line mode, the electrical signals produced by the amplifier 26 are applied to the party line terminals, TB1 and TB3, of a terminal block 30. Terminals TB1 and TB3 are connected by lines 14c and 14d to respective wires 14a and 14b of the party line 14. When the intercom is in a page line mode, the signals produced by the amplifier 26 are applied to the page line terminals, TB2 and TB4, which are connected by lines 16c and 16d to respective wires 16a and 16b of the page line 16.

The intercom station 12 includes a switching circuit 32 the enables the user to selectively switch the intercom station 12 between party line and pages line modes. The switching circuit 32 includes five switches which are designated as switches S1-S5. The switching circuit 32 also includes a page relay 34 which operates switches S1-S3 and a hook relay 36 which operates switches S4 and S5. The page relay 34 is energized by pressing a page button 38 mounted to the intercom station housing. (See FIG. 1) The hook relay 36 is energized whenever the hook 40 supporting the handset 24 is raised. This occurs whenever the handset 24 is taken off the hook.

Line 42 from amplifier 26 is connected to terminal TP4 of switch S2. In the party line mode, switch S2 connects terminal TP4 to terminal TP5 which is connected by line 50 to terminal TB3 of the terminal block 30. Line 44 from amplifier 26 is connected to terminal TH1 of switch S4. When the handset 24 is on hook 40, switch S4 creates an open circuit as shown in FIG. 2. Thus, when the handset 24 is on hook 40, no communications, whether page line or party line communications, can be transmitted from the intercom station 12. When the handset 24 is taken off hook 40, the hook relay 36 is energized causing switches S4 and S5 to close. The output terminal TH3 of switch S4 is connected to the input terminal TP1 of switch S1 by line 46. In the party line mode, the input terminal of TP1 of switch S1 is connected to output terminal TP2 which is connected by line 48 to terminal TB1 of the terminal block 30.

From the foregoing, it is apparent that in the party line mode, communications originated at the intercom station 12 are transmitted over the party line 14. Anyone connected to the party line 14, that is anyone with the handset 24 off its hook 40, can listen to the party line communication.

The intercom station 12 is placed in a page line mode by depressing a page line button 38 to energize the page relay 34. The page relay causes the switches S1-S3 to move to the position shown by the dotted line in FIG. 2. Switches S1 and S2, which normally connects lines 42 and 44 with the party line 14 will, after the page relay 36 is energized connect them to the page line 16. More particular, when the page relay 34 is energized, terminal TP1 of switch S1 is connected to output terminal TP3 which is connected by line S2 to terminal TB2. The input terminal TB4 of switch S2 is connected to output terminal TB6 which is connected by line 54 to terminal TB4 of the terminal block 30. Thus, by pressing the page relay button, voice communications originating at the intercom station 12 are transmitted to remote intercom stations 12 via the page line 16.

The speaker 28 is also connected to the page line by the switching circuit 32 so that page communications originating at remote intercom stations 12 are broadcast over speaker 28. As seen in FIG. 2, terminal TP3 of switch S1 is connected by line 56 to the positive terminal of page amplifier 67. Terminal TP6 of switch S2 is connected by line 58 to the negative terminal of page amplifier 67. Whenever a differential exist between the input terminals of the page amplifier 67, the electrical signals are output via line 68 to speaker 28. It will be readily apparent therefore that all page communications originating from remote intercom stations 12 will be broadcast over speaker 28. However, it is desirable to mute speaker 28 at the station where any page line communication is originated to prevent feedback. The muting function is accomplished by shorting the page amplifier A1.

In the switching circuit 32 shown, switches S3 and S5 are operative to mute speaker 28. Line 60 connects line 56 to input terminal TP7 of switch S3 which is normally open. When the page relay 34 is energized, switch S3 closes. Line 62 connects the output terminal TP9 of switch S3 to the input terminal TH4 of switch S5 which is normally open. When the handset 24 is off its hook 40, the hook relay 36 is energized thereby closing switch S5. The output terminal TH6 of switch S5 is connected by lines 64 to the mute terminal TB5 of the terminal block 30. The mute terminal TB5 is also connected by line 66 to the negative side of the page amplifier 67. When both switches S3 and S5 are closed, the page amplifier 67 is shorted thereby disabling speaker 28. This condition exists only when the hand set 24 is off its hook 40 and the page button 38 is depressed. Thus, the speaker 28 is muted during page communications originating with that station, but is not muted by page communications originating at remote stations.

The station module 18 is connected to the terminal block 30 of an existing intercom station 12 as shown in FIG. 2. The station module monitors the signal across the mute and page line 1 terminals TB4 and TB5, respectively. This signal is hereinafter referred to as the mute signal. It is evident that the mute signal is present only at the station from which the page communications originate. By using this typical muting feature provided by most page intercom systems, the page monitor system of the present invention is able to isolate the local station originating a page communication for individual station identification. When the mute signal is detected the station module 18 generates a station identification code which is transmitted via the party line 14 and is recorded by the computer 22.

While the described embodiment uses the mute signal to trigger the generation of a station identification code, the present invention is not so limited. Any local station signal unique to the intercom station originating a page communication can be employed. The present invention uses the mute signal because it is easily detected. Further, because the mute signal is a voice signal, the code generation function can be voice actuated.

Figure 3:
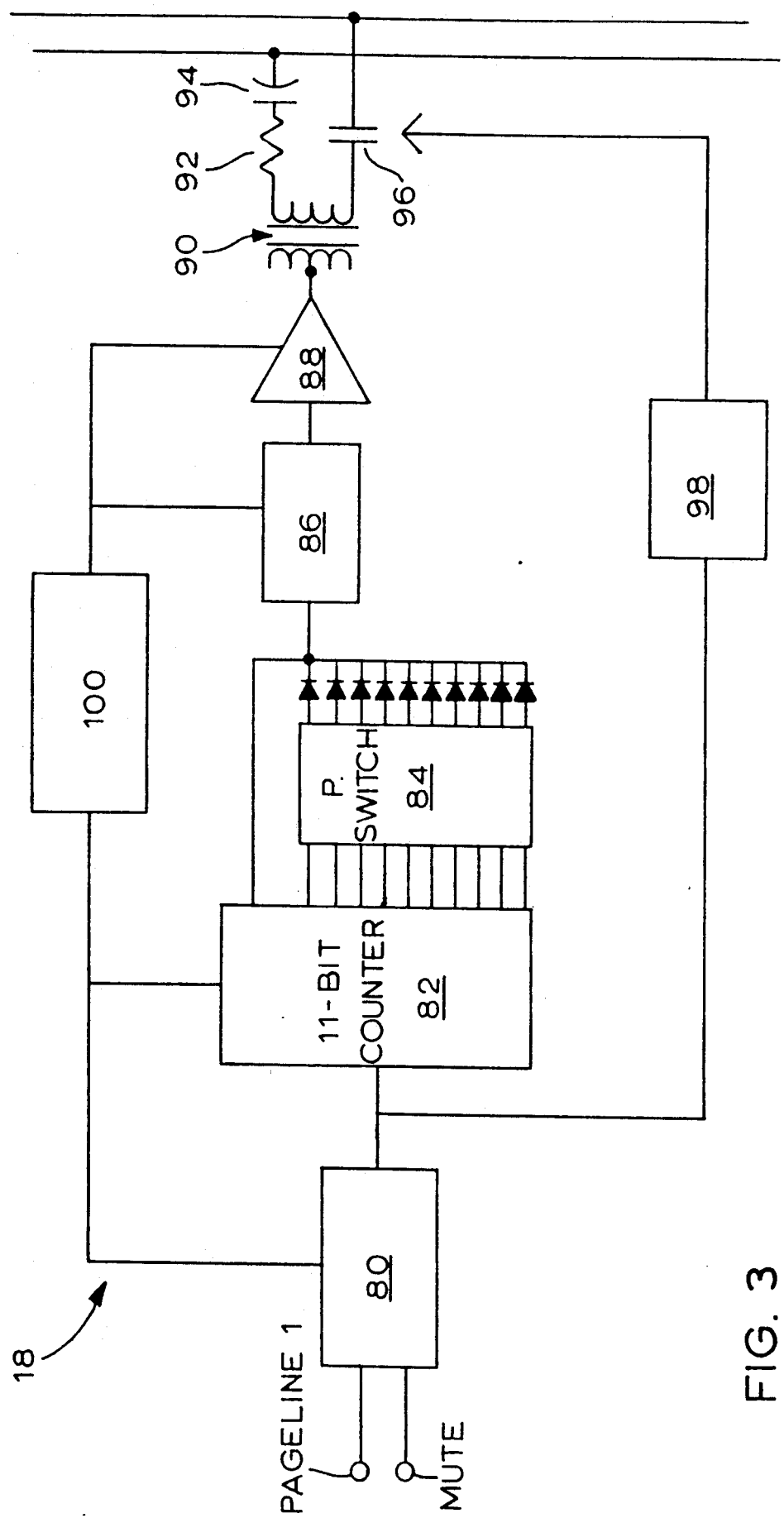
FIG. 3 is a block diagram of the station module.

Referring now to FIG. 3, a block diagram of the station module 18 is shown. The station module 18 includes a sound detection circuit 80 which continuously monitors the signal between the page line 1 and mute terminals. When the sound reaches a predetermined threshold, the sound detection 80 initiates generation of a station identification code which is carried out by an eleven bit counter 82 and a programming switch 84. Each time the sound detection circuit 80 is triggered, one sequence of counts will occur. This sequence of counts is coded by the programming switch 84 to a unique station identification code for this station module 18. The station identification code is modulated and filtered using standard techniques to condition the signal for transmission over the party line 14. The modulating and filtering components are illustrated schematically at 86. Amplifier 88 amplifies the station identification code for transmission on the party line. The output of the amplifier 88 is coupled to the party lines 14a and 14b by means of a transformer 90 which is designated to impedance match the party line 14. Resistor 92 and capacitor 94 block any low frequency (voice) from the party line 14.

An isolation relay 96 isolates the station module output when the station module 18 is not in use to keep the station module 18 from loading the party line 14. The isolation relay 96 is actuated by a relay driver 98 which is also responsive to the sound detection circuit 80. Thus, the indentification signal is present only during local station paging and is automatically isolated when the local station returns to party line use. Power for the station module is provide by a dual voltage power supply 100 which converts a 110 volt alternating current.

Figure 4:
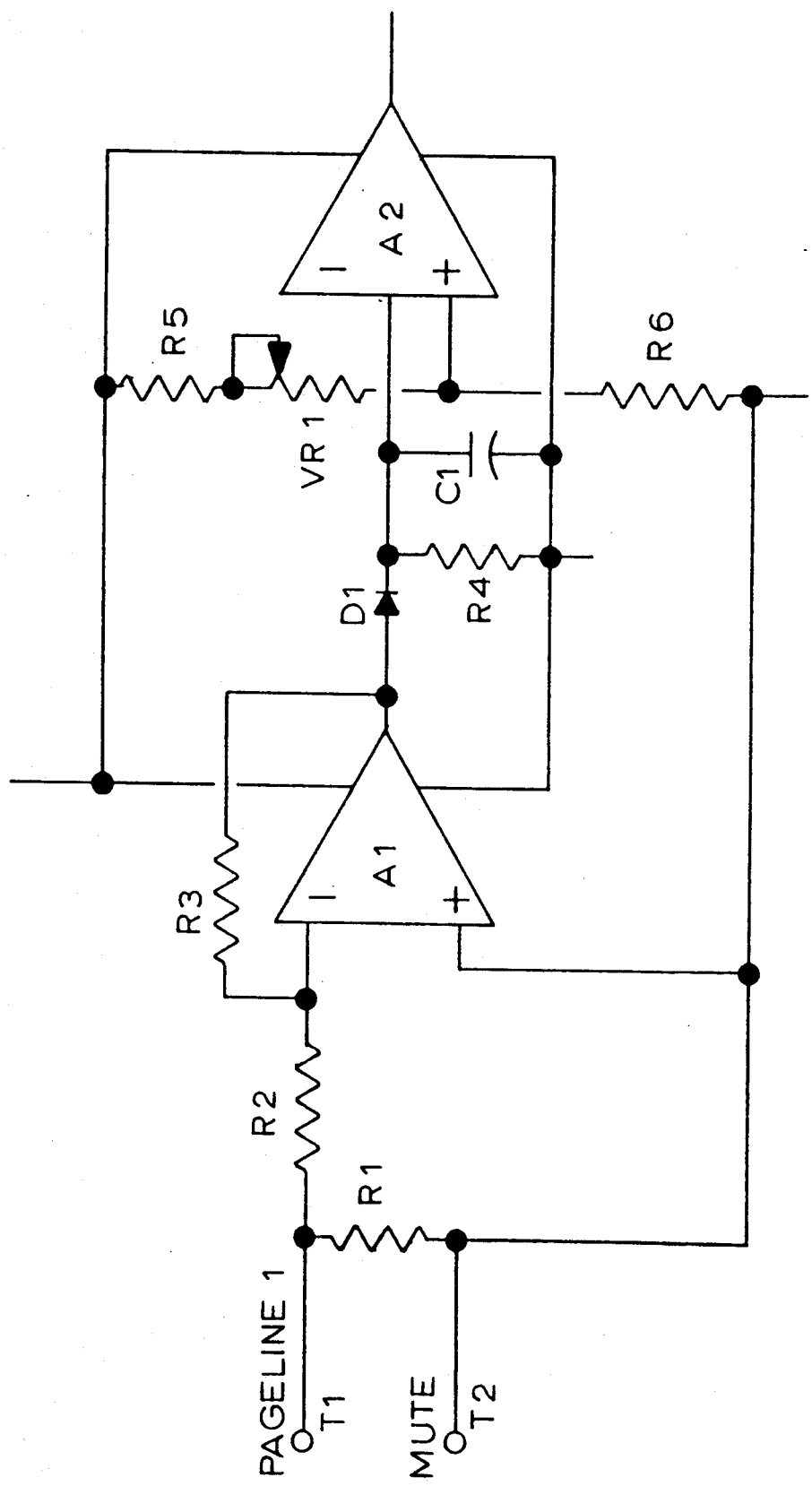
FIG. 4 is a schematic diagram of the sound detection circuit of the station module.

Referring now to FIG. 4, the sound detection circuit is illustrated. The sound detection circuit includes input terminals T1 and T2 which are connected respectively to the PAGE LINE 1 and MUTE terminals of the terminal block 30. A resistor R1 is connected between terminals T1 and T2 to establish an input impedance of 100 ohms to reduce spurious noise from the page station and to eliminate false triggers. The input signal between T1 and T2 is applied to a unity gain buffer amplifier consisting of resistors R2 and R3 and operational amplifier A1. The output from the buffer amplifier is applied to a signal detector consisting of a diode D1, resistor R4 and capacitor C1 which are configured as a positive peak reading detector with one millisecond time constant. Resistor R4 and capacitor C1 determine the length of sound required to trigger code generation. The buffered and detected input signal is applied to a comparator circuit consisting of resistors R5 and R6, potentiometer VR1, and operational amplifier A2. The input signal is applied to the negative terminal of the operational amplifier A2. A reference signal is applied to the positive terminal of the amplifier A2 and is derived from the power supply voltage. Resistors R5 and R6 function to maintain the comparator reference voltage within a desired range. The potentiometer VR1 varies the comparator reference voltage to provide sensitivity adjustment. By adjusting the potentiometer VR1, the sound detector can be adjusted to trigger at the desired voice level.

The output of amplifier A2 is normally high. When a signal is detected between PAGE LINE and MUTE, the output of amplifier A2 goes low thereby triggering the 11 bit counter 82. The counter 82 generates a unique station identification code. Also, the relay driver 98 is energized, which in turn closes the isolation relay 96. After modulation and filtering, the station identification code is transmitted as a series of high frequency pulses which are inaudible to anyone using the party line. The station code is transmitted at the beginning and end of each sound detected.

Figure 5:
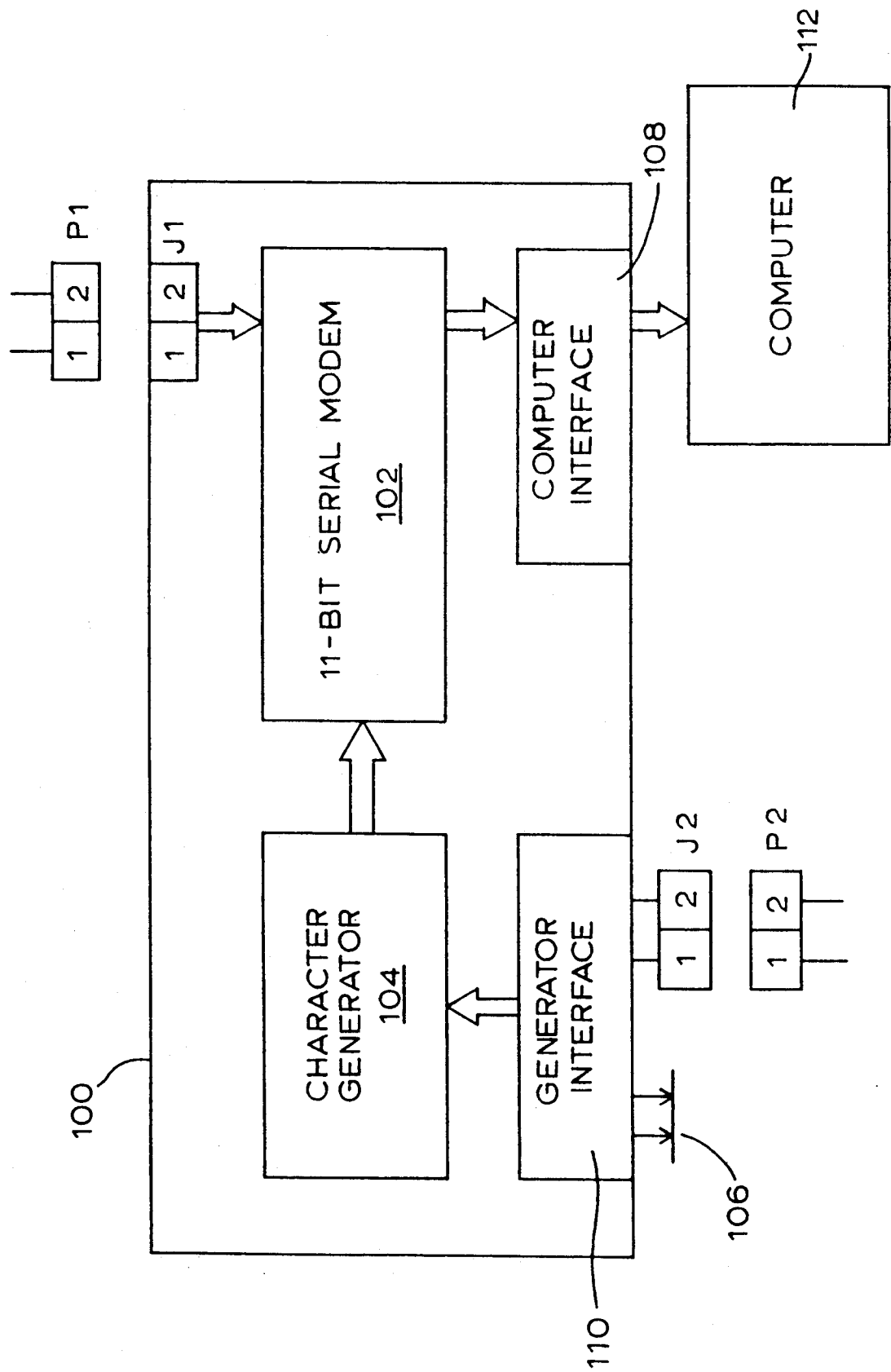
FIG. 5 is a block diagram of the master station module.

Referring now to FIG. 5, a block diagram of the master station is shown and indicated generally by the numeral 100. The master station module 100 include a standard eleven bit serial modem 102 centered at 40 khz. The master station module 100 includes a jack J1 connected to a standard eleven bit analogue input of the modem 102. The master station module 100 also concludes a character generator 104 which produces a unique code to flag abusive page communications. The character generator can be actuated by a push button switch 106 mounted on the master station module housing. The station module also includes a standard jack J2 which can be used to remotely actuate the character generator 104. The master station module receives the station identification code pulses and converts it the serial eleven bit code to a parallel eight bit suitable for computer use. The additional three bits are used by the modem 84 for error detection and parity checks.

The master station module 100 will typically be located in a security office or in the office of management personnel. The master station module will automatically transmit the station identification codes received from a page station module to a computer where it will be recorded along with the time of each page communication. Whenever an abusive page communication is made, security or management personnel can press the push buttom 106 on the master station module 100 or trigger the character generator. The character generator generates a unique code which is used as an abuse signal. The abuse signal is supplied to the modem and is transmitted to the computer through a standard RS 232 interface indicated generally at 94. The abuse signal is also recorded in the computer along with the time of the abuse signal. The station identification codes and time of all page communications can be displayed on the computer in real time. However, this information is also stored in the computer's memory for subsequent retrieval and analysis. By comparing the time of the abuse signals to the time of page communications, the location from which such abusive call are made can be easily identified.

The present invention may, of course, be carried out in other specific ways that those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An intercom paging system having a plurality of individual intercom stations connected to first and second party line, wherein each station includes voice transmission and receiving means communicating with other intercom stations via the first party line and means for making page communications via the second party line, a communication identification system for identifying and recording the source intercom station from which page communications originate, comprising:
   a) a station module associated with each intercom station and including:
      1) means for sensing a local station signal which is present only during page communications, and
      2) means for generating a station identification signal in response to a local station signal being sensed;
   b) means for transmitting the station identification signal over one of the first and second party lines; and
   c) a master station communitively connected to at least one of the party lines for receiving the station identification signals generated by the station modules, the master station including data storage means for storing the station identification signals and the time such signals were received so that a record of the time and location of each page communication is maintained.

2. The communication identification system according to claim 1 wherein the station identification signals are transmitted to the master station over the second party line.

3. The communication identification system according to claim 1 wherein the local station signal being sensed is a sound signal.

4. The identification system according to claim 3 wherein the local station signal being sensed is a mute signal.

5. In a multi-station intercom paging system having a plurality of intercom stations connected to at least one party line, a method for indentifying the source station from which page communications originate comprising:
   a) sensing a local station signal during page communications unique to the source station;
   b) generating a station identification code unique to the source station in response to a local station signal being sensed; and
   c transmitting the station identification code to a recording station where the station identification code is stored for subsequent retrieval.

6. The method according to claim 5 wherein the local station signal being sensed is a mute signal.

7. The method according to claim 5 wherein the station identification code is transmitted over the party line to which intercom station is connected.

8. The method according to claim 7 wherein the station identification code is transmitted at a frequency rendering the code inaudible to anyone using the party line.

9. The method according to claim 5 wherein the time of each page communication is stored at the recording station.

* * * * *

UNITED STATES PATENT AND TRADEMARK OFFICE
CERTIFICATE OF CORRECTION

PATENT NO. : 5,033,080
DATED : July 16, 1991
INVENTOR(S) : David W. Deane

It is certified that error appears in the above-identified patent and that said Letters Patent is hereby corrected as shown below:

Column 3, line 23, after "as", add --not--.

Column 4, line 21, replace "S2", with --52--.

Column 4, line 22, replace "TB4", with --TP4--.

Column 4, line 23, replace "TB6", with --TP6--.

Column 5, line 10, replace "22", with --112--.

Column 5, line 51, replace "100", with --99--.

Column 6, line 55, replace "94", with --108--.

Column 6, line 66, replace "that", with --than--.

UNITED STATES PATENT AND TRADEMARK OFFICE
CERTIFICATE OF CORRECTION

PATENT NO. : 5,033,080
DATED : July 16, 1991
INVENTOR(S) : David W. Deane It is certified that error appears in the above-identified patent and that said Letters Patent is hereby corrected as shown below:

IN THE DRAWINGS:

FIG. 3, replace "100", with --99--.

Signed and Sealed this

Ninth Day of February, 1993

*Attest:*

STEPHEN G. KUNIN

*Attesting Officer*   Acting Commissioner of Patents and Trademarks